Nov. 4, 1969  J. V. PASTVA, JR  3,476,410

PIPE COUPLING

Filed Dec. 18, 1967

INVENTOR.
JOHN V. PASTVA JR.
BY Watts, Hoffmann,
Fisher & Heinke
ATTORNEYS.

United States Patent Office 3,476,410
Patented Nov. 4, 1969

3,476,410
PIPE COUPLING
John V. Pastva, Jr., Parma Heights, Ohio, assignor to The Eastern Company, Cleveland, Ohio, a corporation of Connecticut
Filed Dec. 18, 1967, Ser. No. 691,335
Int. Cl. F16l 21/06
U.S. Cl. 285—112                                5 Claims

ABSTRACT OF THE DISCLOSURE

A split ring type pipe coupling having an internal groove housing a packing ring preferably of the so-called self-sealing type and comprising two semicircular sections of identical configuration having differently shaped lugs on opposite ends, with two differently shaped lugs interfitting and pivotally connected together and the opposite lugs also interfitting and detachably connected together by a bale type latch. The coupling can be quickly and easily employed to temporarily connect adjoining ends of aligned pipe members having external annular abutment surfaces facing away from one another on said adjoining ends of said pipe members.

---

This invention relates to a coupling for connecting two pipe members.

A principal object of this invention is to provide a novel coupling that is convenient to manufacture, which can be quickly and easily installed and removed and which requires no clamping bolts.

Another object is to provide a coupling of two semicircular sections with two ends pivoted together at one location and the two other free ends selectably connectable by a lever operated clasp that clamps the two sections tightly around the ends of axially aligned pipe members and retains the sections in assembled relationship with the pipe members.

Another object is to provide a novel coupling of the type referred to above comprising two identical sections each having dissimilar lugs at opposite ends and in which a dissimilar end of each section is connected together to form a pivoted connection at one location and a latch connection at a diametrically opposite location.

A further object of the invention is to provide a novel coupling of the character above indicated in which a flexible gasket can be clamped around the juncture of coupled pipe members with the coupling and the gasket and coupling can be held in place by a lever operated clasp.

Other objects, features and advantages of this invention will be apparent in the detailed description that follows and in the accompanying drawings which form a part of this specification, in which.

Figure 1:
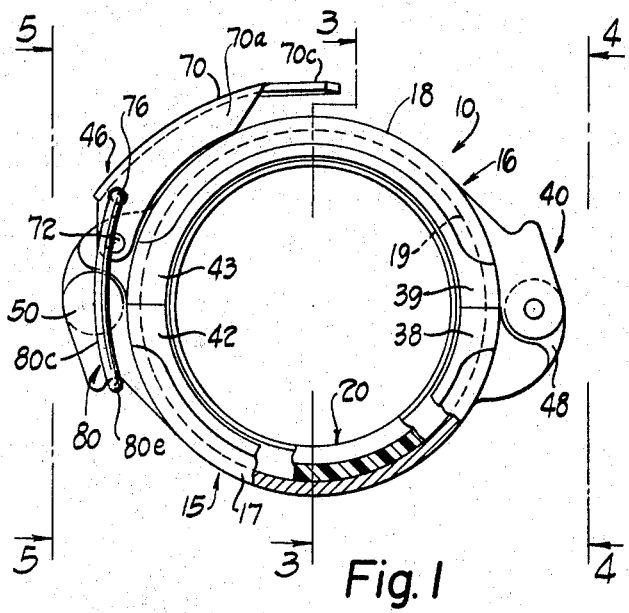
FIGURE 1 is a front elevational view, with parts broken away and parts in section illustrating a pipe coupling embodying the present invention.
Figure 2:
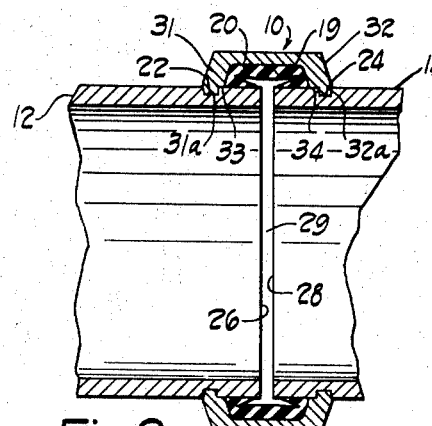
FIGURE 2 is a longitudinal sectional view illustrating the manner in which two pipe members are joined together by the coupling shown in FIGURE 1.
Figures 3, 5:
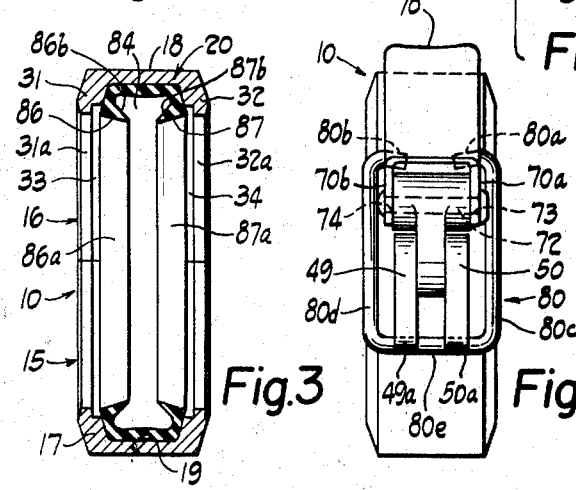
FIGURE 3 is a transverse sectional view of the coupling of FIGURE 1 taken along the line 3—3 and looking in the direction of the arrows.
FIGURE 5 is a side elevational view of the pipe coupling of FIGURE 1 viewed from the plane 5—5 and looking in the direction of the arrows.

Referring now to the drawings, and with particular reference to FIGURES 1 to 3, a split ring type pipe coupling embodying the present invention is generally indicated at 10. The coupling 10 is in the form of a circular clamp for connecting adjacent ends of two axially aligned pipes 12, 14, in the manner illustrated in FIGURE 2.

The coupling 10 is formed of two sections 15, 16 each having a semicircular body portion 17, 18, respectively, generally U-shaped in cross section and concave inward, and which together form an annular chamber 19. A flexible annular gasket 20 is carried within the chamber 19 to seal the pipe joint formed between two pipes that are coupled with the coupling 10.

The pipe members 12, 14 joined by the coupling 10 have external annular grooves 22, 24, respectively, spaced a short distance from adjacent ends 26, 28 of the pipe members 12, 14, which are preferably separated by a small gap 29. The grooves provide external annular abutment surfaces engageable by the coupling 10. The U-shaped cross sectional shape of the two wall portions 17, 18 of the coupling 10 provides two spaced annular flanges 31, 32 that extend radially of the coupling. Portions of the flanges 31, 32 engage external annular abutment surfaces of the pipe members formed by the grooves 22, 24. In the preferred embodiment shown, flange portions 31a, 32a of reduced thickness fit within the grooves 22, 24 and inner circular shoulders 33, 34 formed in the flanges 31, 32 engage the outer periphery of the pipe members inwardly of the grooves 22, 24 and aid in maintaining the pipes in axial alignment.

The two sections 15, 16 are connected together at an end 38 of the coupling section 15 and at an end 39 of the coupling section 16 by a pivotal connection 40. The free end 42 of the section 15 and the free end 43 of the section 16 are releasably fastened together by a clasp 46 at a location diametrically opposite from the pivotal connection. The clasp clamps the two coupling sections 15, 16 tightly about the ends of the pipes 12, 14 to rigidly connect the pipes together.

Figure 4:
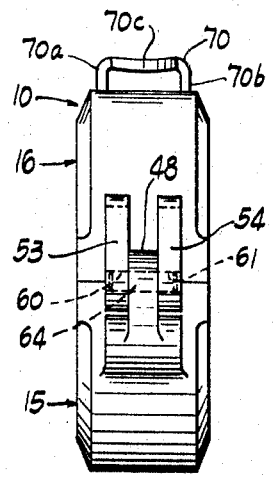
FIGURE 4 is a side elevational view of the coupling of FIGURE 1 viewed from the plane 4—4 and looking in the direction of the arrows.
Figure 6:
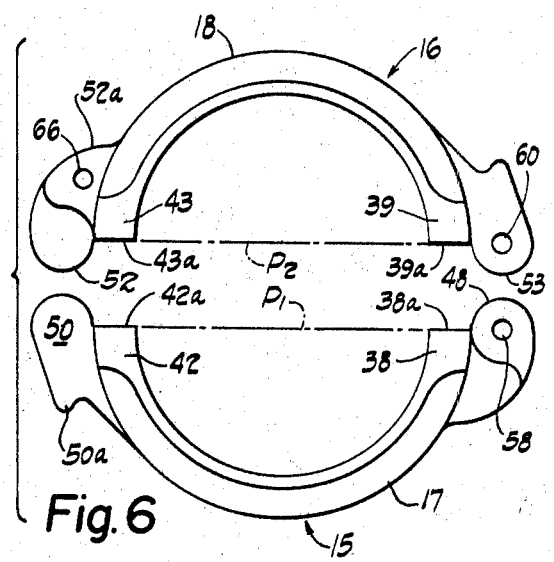
FIGURE 6 is an exploded view of the two sections forming the pipe coupling of FIGURE 1, with parts removed, illustrating the shape of each section.

As best shown in FIGURES 4 to 6, each coupling section 15, 16 is identical in shape, oppositely oriented from the other and has lugs at each end to accommodate the pivotal connection 40 and clasp 46. A single lug 48 extends circumferentially beyond a flat end surface 38a of the pivoted end 38 of the section 15 and radially beyond the semicircular body portion 17. Two spaced side-by-side lugs 49, 50 extend circumferentially beyond a flat end surface 42a of the free end 42 of the section 15 and radially beyond the semicircular body portion 17. The end surfaces 38a, 42a lie in a common plane P1. The lug 48 is located centrally of the width of the U-shaped body portion 17. The lugs 49, 50 are located on opposite sides of the central zone in which the lug 48 is located and are spaced apart a distance slightly greater than the thickness of the lug 48. Each lug 49, 50 has a hook defining portion 49a, 50a that is located behind and extends rearwardly, i.e., circumferentially away from the associated end surface 42a.

Similarly, the section 16 has end surfaces 39a, 43a in a common plane P2, a single centrally located lug 52 at the end 43 and corresponding to the lug 48 of section 15, and two spaced lugs 53, 54 at the end 39 and corresponding to lugs 49, 50 of section 15.

A hole 58 is provided through the lug 48. The axis of the hole is located in the plane of the end surface 38a, and radially outward from the body portion 17. A hole 60 is provided through the lug 53 and a hole 61 is provided through the adjacent lug 54 of the section 16. The two holes 60, 61 are in axial alignment with each other and the common axis is in the plane of the end surface 39a, and radially outward from the body portion 18 a distance corresponding to the radially outward distance of the axis of the hole 58 relative to the body portion 17. As a result of this construction, when the surfaces 38a and 39a abut each other in face-to-face alignment, the holes 58, 60, 61 are axially aligned. A pivot pin 64 retains the holes in alignment, secures the ends 38, 39 of the sections 15, 16 together and permits relative pivotal movement of the sections.

A hole 66 is provided through the lug 52 of the section 16 at a location displaced from the plane of the end surface 43a a distance greater than the extent to which the lugs 49, 50 extend beyond the plane of the end surface 42a of section 15. This hole is located in a wider portion 52a of the lug 52 that does not fit between the lugs 49, 50 and the hole 66 facilitates the attachment of the clasp 46. No holes are provided in the lugs 49, 50.

The sections 15, 16 are preferably formed initially by casting sections from the same or identical molds. Typically the sections 15, 16 are formed of malleable iron. Thereafter the hole 58 is formed in the lug 48, the holes 60, 61 are formed in the lugs 53, 54 and the hole 66 is formed in the lug 52, as by drilling operations.

As best shown in FIGURES 1 and 5, the clasp 46 acts as an over-center clamp to hold the free ends 42, 43 of the sections 15, 16 tgether. A finger lever 70 is pivoted at a forward end to the lug 52 of the section 16 by a rivet 72 passing through the hole 66. The lever 70 is curved to extend about the semicircular body portion 18 of the section 16 and is generally channel shaped for rigidity, having depending flange portions 70a, 70b. The rivet 72 extends through axially aligned holes 73, 74 at the forward ends of the flange portions 70a, 70b. These flange portions extend only partially along the length of the lever, leaving a flat rear end portion 70c. The flange portions lie along the body portion 18 when the clasp is closed and the end portion 70c facilitates grasping and lifting the lever with the fingers.

Second holes 76, one of which is shown in FIGURE 1 are provided in the flanges 70a, 70b axially aligned with each other and rearward of the rivet 72. A spring link 80 of heavy wire is pivotally secured to the lever 70. The link 80 is generally U-shaped, with free ends 80a, 80b turned in and received in the holes 76. From the ends 80a, 80b the link extends with longitudinal portions 80c, 80d spaced apart beyond the width of the two lugs 49, 50 and curved to partially follow the contour of the semicircular body portions 17, 18. A transverse portion 80e serves to engage the lugs 49, 50 behind the hook portions 49a, 50a when the clasp is closed. The length of the link is sufficient to fit over the lugs 49, 50 when the lever 70 is pivoted away from the body portion 18 and is sufficient to pull the section 15 toward the section 16 in response to movement of the lever toward the body portion 18 until the end surfaces 42a, 43a of the coupling sections are in contact or until the flanges 31, 32 and/or shoulders 34, 35 clamp the pipe members being coupled. The curvature of the link provides resiliency that permits the lever 70 to carry the pivoted end of the link 80 over and past the lever pivot formed by the rivet 72 to an over-center location where the link acts to bias the lever 70 against the body portion 18 of the section 15.

The annular gasket 20 carried within the chamber 19 of the coupling 10 is generally channel shaped, having a central annular groove 84 that opens centrally. Spaced edges of the groove are formed with lips 86, 87 each having a flat sealing surface 86a, 87a adapted to seat against the outer periphery of the pipe members being coupled. Each lip is located on an opposite side of the gap 29 between the pipe ends. An inclined inner surface 86b, 87b on each lip causes the pressure of fluid that will enter the groove 84 from between the pipe members to press the lips against the pipe members and the gasket thereby effectively seals the gap 29. Typically, the gasket is formed of elastomeric material, such as synthetic rubber or the like.

In use, the sections 15, 16 are pivoted apart to apply the clamp to the ends of two pipe members such as the members 12, 14, which are axially aligned to provide a through passage. The gasket 20 is positioned so that it encircles both pipe members 12, 14 with the lips 86, 87 on opposite sides of the gap 29. The sections 15, 16 of the coupling 10 are located to circumferentially encircle the adjacent ends 26, 28 of the pipe members and the sections are pivoted toward each other so that portions of the flanges 31, 32 are received in the grooves 22, 24. The clasp lever 70 is pivoted away from the body portion 18 and the link 80 is placed over the lugs 49, 50. The lever 70 is then pivoted toward the body portion 18, pulling the two sections 15, 16 together so that they tightly surround the ends of the pipes 12, 14. The clasp 46 holds the coupling 10 in fixed position until the finger lever 70 is pivoted away from the body portion 18 to release the clasp 46. When fluid under pressure is applied to the coupled pipes it enters the groove 84 of the gasket 20 through the gap 29 between the pipe members and forces the gasket into fluid-tight sealing relationship with the pipe members.

While a preferred embodiment of the present invention has been described in detail, it will be apparent that various modifications or alterations can be made in the specific construction without departing from the spirit and scope of the invention.

What is claimed is:

1. In a pipe coupling for connecting adjoining ends of aligned pipe members having external annular abutment surfaces adjacent to and facing away from their ends, two coupling sections hinged together at one location and latched together at a diametrically opposite location and shaped to encircle adjacent ends of two axially aligned pipes and engage external annular abutment surfaces thereof, each said section being of identical shape to the other with end surfaces adapted to be opposed to end surfaces of the other and having differently shaped lug means at opposite ends extending circumferentially beyond said end surfaces and adapted to overlap with a differently shaped lug means of the other section, the lug means at one of said opposite ends of each section including a hook forming portion, a pivot pin extending through differently constructed overlapping lugs of the two sections to connect the two sections together for relative pivotal movement, and a clasp, including a link connected to a free end of one of said sections, engageable with the hook portion of the lug means at the free end of the other section to releasably connect the free ends together.

2. In a pipe coupling for connecting adjoining ends of aligned pipe members having external annular abutment surfaces adjacent to and facing away from their ends, two coupling sections hinged together at one location and latched together at a diametrically opposite location and shaped to encircle adjacent ends of two axially aligned pipes, each said section being of identical shape to the other, semicircular in shape with a cross section generally U-shaped and concave inwardly and with flange portions forming a part of the U-shaped cross sectional shape for engaging annular abutment surfaces at adjacent ends of two axially aligned pipe members, a flexible circular gasket surrounded by the said sections and at least partially received in the said U-shaped cross sectional portion, said gasket having an annular central space or groove opening inwardly and having generally inturned lips along opposite edges of the groove adapted to bear on the surface of pipe members coupled by the coupling, each said section having end surfaces adapted to be opposed to end surfaces of the other section and also having differently shaped lug means at opposite ends extending circumferentially beyond said end surfaces and adapted to overlap with differently shaped lug means of the other section, the lug means at one of said opposite ends of each section including a hook forming portion, a pivot pin extending through differently shaped overlapping lugs of the two sections to connect the two sections together for relative pivotal movement, and an over-center lever and link clasp connected to a free end of one of said sections engageable with the hook portion of the lug means at the free end of the other section to releasably connect the free ends together.

3. In a coupling for connecting adjoining ends of aligned pipe members having external annular abutment surfaces adjacent to and facing away from their ends, first and second coupling sections of identical contour each having (a) a semicircular pipe engaging portion of a width sufficient to extend over end portions of pipes to be coupled, with flanges for engaging external annular abutment surfaces adjacent the ends of said pipe members, and with two opposite end surfaces, one at each opposite end of the semicircular portion situated in a common plane perpendicular to the plane defined by the semicircular pipe engaging portion and adapted to substantially abut the end surfaces of the other section, (b) lugs at said opposite ends extending radially beyond the semicircular pipe engaging portion and circumferentially beyond the said perpendicular plane in which the said end surfaces lie, said lugs including a first lug at one end located centrally of the width of the section and second and third lugs at the opposite end spaced apart on opposite sides of a zone centrally located relative to the width of the section a distance sufficient to receive a first lug of the other coupling section therebetween, at least one of the said second and third lugs having a hook portion directed away from the adjacent end surface; holes with axes perpendicular to the plane of the coupling section through lugs of the first and second coupling sections as follows: a first hole through the said first lug of the said first section located with the axis of the hole in the said perpendicular plane of the end surfaces, a second hole through the said first lug of the said second section displaced from the said perpendicular plane of the end surfaces a distance greater than the extent to which the said second and third lugs of the first section extend beyond the said perpendicular plane in which the end surfaces of the first section lie, and third and fourth axially aligned holes in said second and third lugs of second section located with their axes in the perpendicular plane of the end surfaces of the second section and radially beyond the semicircular pipe engaging portion a distance corresponding to that of the said first hole; the two sections being pivotally secured together with the said first lug of the first section located between the said second and third lugs of the second section with the holes of the lugs aligned and a pin extending through the holes; and a clasp comprising a lever pivotally secured through the said second hole to the said first lug of the said second section and a spring link pivotally secured to the lever and constructed to fit over the second and third lugs of the said first section when the first and second sections are pivoted into a circular configuration.

4. In a coupling for connecting adjoining ends of aligned pipe members having external annular abutment surfaces adjacent to and facing away from their ends, first and second coupling sections of identical contour each having (a) a semicircular pipe engaging portion of a width sufficient to extend over end portions of pipes to be coupled, with flanges for engaging external annular abutment surfaces adjacent the ends of said pipe members, and with two opposite end surfaces, one at each opposite end of the semicircular portion and situated in a common plane perpendicular to the plane defined by the semicircular pipe engaging portion and adapted to substantially abut the end surfaces of the other section, (b) lugs at said opposite ends extending radially beyond the semicircular pipe engaging portion and circumferentially beyond the said perpendicular plane in which the said end surfaces lie, said lugs including a first lug at one end located centrally of the width of the section and second and third lugs at the opposite end spaced apart on opposite sides of a zone centrally located relative to the width of the section a distance sufficient to receive a first lug of the other coupling section therebetween, at least one of said first, second and third lugs on one end of each of said sections having a hook portion directed away from the adjacent end surface; holes with axes perpendicular to the plane of the coupling section through lugs of the first and second coupling sections, including holes through the two lugs at the end of one section and the one centrally located lug at the end of the other section having axes lying in the said perpendicular plane in which the end surfaces of the sections lie and adapted to receive a common pivot pin; a pivot pin through said holes; means, associated with the lugs at the opposite ends of the sections from the said lugs that receive a pivot pin, for attaching a clasp to one section engageable with a hook portion on the other section; and a clasp comprising a lever pivotally attached to one section by said last mentioned means and a spring link pivotally secured to said lever and constructed to fit over a hook portion on the other section when the first and second sections are pivoted into a circular configuration.

5. In a pipe coupling for connecting adjoining ends of aligned pipe members having external annular abutment surfaces adjacent to and facing away from their ends: two coupling sections hinged together at one location and latched together at a diametrically opposite location and shaped to encircle adjacent ends of two axially aligned pipes and engage external annular abutment surfaces thereof, each said section (a) being of identical shape to the other, (b) having differently shaped lug means at opposite ends adapted to overlap a differently shaped lug means of the other section, the lug means at one of said opposite ends including a hook forming portion, and (c) having two opposite end surfaces, one at each opposite end of the section, situated in a common plane and adapted to substantially abut with the end surfaces of the other section; said lug means extending circumferentially beyond said end surfaces, a pivot pin extending through differently constructed overlapping lug means of the two sections to connect the two sections together for relative pivotal movement; and a clasp, including a link connected to a free end of one of said sections, engageable with the hook portion of the lug means at the free end of the other section to releasably connect the free ends together.

References Cited

UNITED STATES PATENTS

| | | | |
|---|---|---|---|
| 3,231,298 | 1/1966 | Tomb et al. | 285—365 X |
| 1,997,152 | 4/1935 | Penick et al. | 285—365 X |
| 2,219,161 | 10/1940 | Jacobs | 285—365 |
| 2,362,454 | 11/1944 | Damsel | 285—366 X |
| 3,113,791 | 12/1963 | Frost et al. | 285—112 |
| 3,181,901 | 5/1965 | Watts | 285—367 |
| 3,201,156 | 8/1965 | Coats | 285—365 |
| 3,346,275 | 10/1967 | Jardins | 285—365 X |

FOREIGN PATENTS 1,334,953  7/1963  France.

THOMAS F. CALLAGHAN, Primary Examiner

U.S. Cl. X.R.

24—270; 285—365